March 29, 1960
T. O. KOSATKA
2,930,644
FACE TYPE SEALING DEVICE
Filed Dec. 16, 1957
2 Sheets-Sheet 1
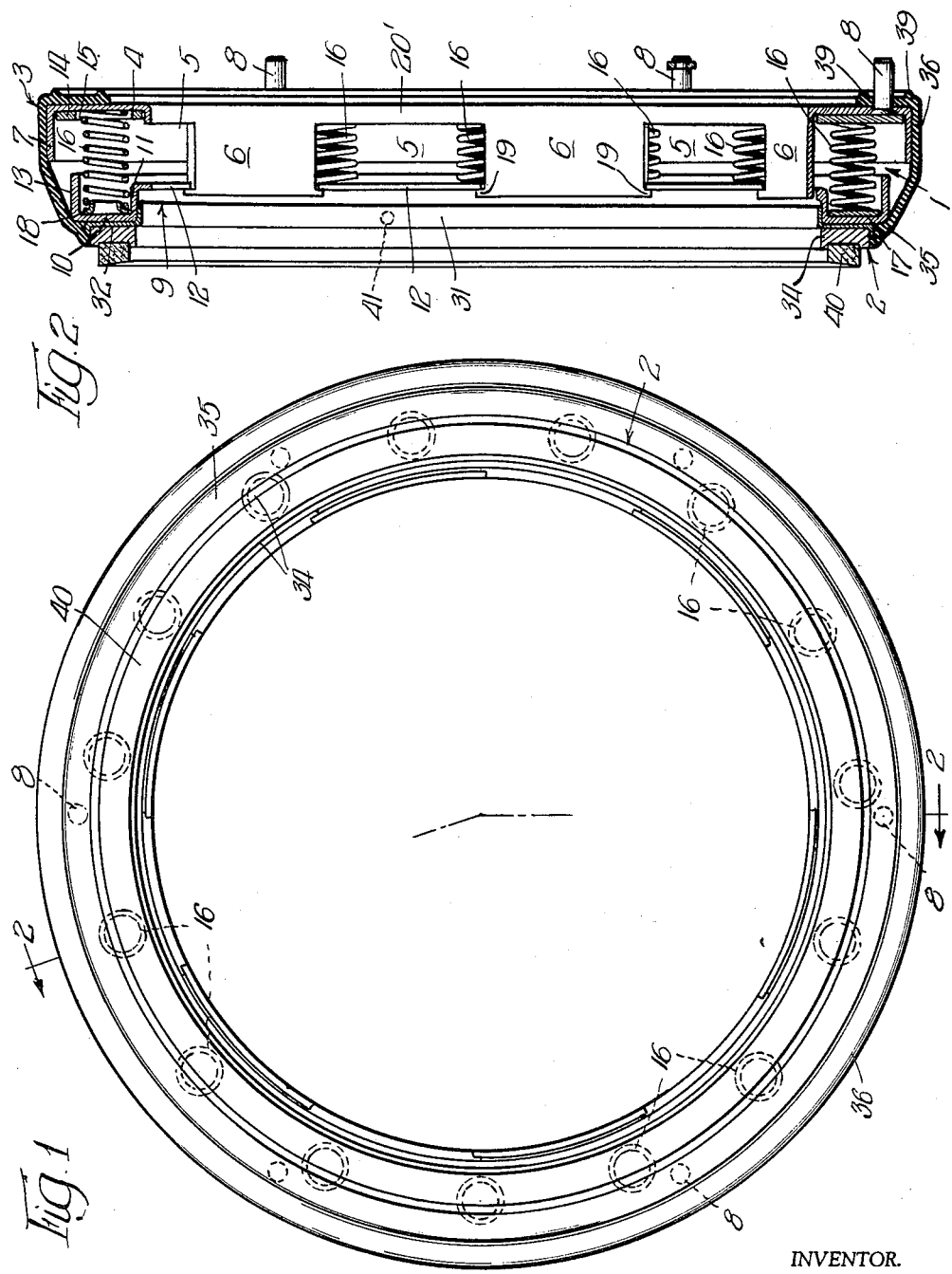
INVENTOR.
Thomas O. Kosatka,
BY
George H. Simmons
Atty.

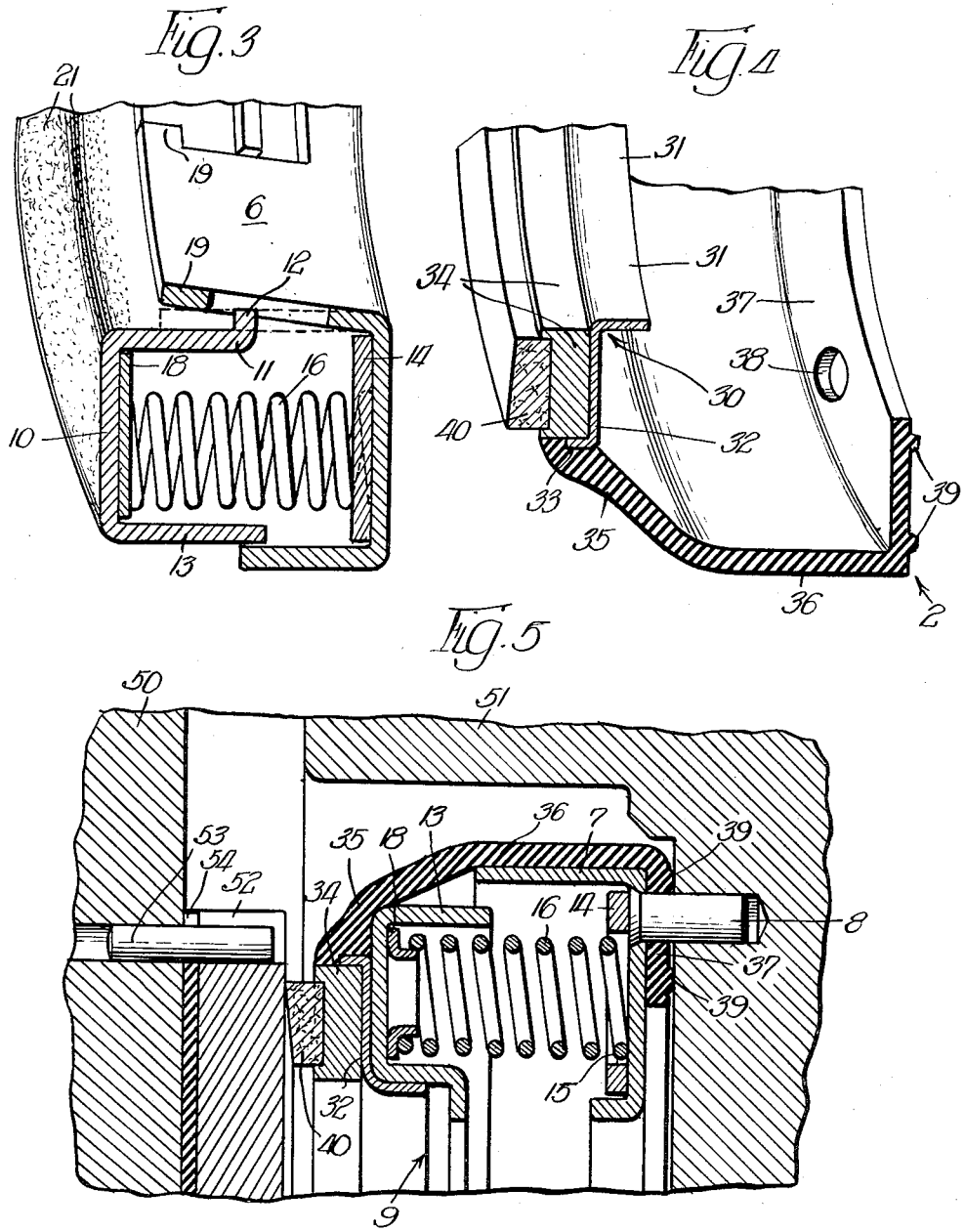

United States Patent Office 2,930,644
Patented Mar. 29, 1960

2,930,644

FACE TYPE SEALING DEVICE

Thomas O. Kosatka, Chicago, Ill., assignor to Victor Manufacturing & Gasket Co., Chicago, Ill., a corporation of Illinois Application December 16, 1957, Serial No. 703,169

9 Claims. (Cl. 288—3)

This invention relates to face type sealing devices for forming a fluid tight seal between a pair of relatively rotatable machine parts and has for its principal object the provision of a new and improved device of this kind.

It is a main object of the invention to provide a face type sealing device for use in heavy duty installations, such as, for example, track-laying type tractors, both for main drive shaft sealing and also for sealing the bearings of the "bogey wheels" which aid in supporting the tractor upon the tracks.

Another object of the invention is to provide a spring unit which can be completely assembled as a unitary structure and tested prior to receiving the seal-forming instrumentalities necessary to complete a seal-forming device.

Another object of the invention is to provide a sealing unit which can be fabricated with a minimum number of molding operations, and, if desired, completely assembled prior to being attached to the spring unit with which it is to be used.

Further objects of the invention, not specifically mentioned here, will be apparent from the detailed description and claims which follow, reference being had to the accompanying drawings in which a preferred embodiment of the invention is shown by way of example and in which:

Fig. 1 is a plan view of the sealing device as seen from the front or sealing side;

Fig. 2 is a cross sectional view through the device taken along the line 2—2 of Fig. 1, looking in the direction of the arrows;

Fig. 3 is a fragmentary cross sectional view of the spring unit at one stage of assembly;

Fig. 4 is a fragmentary cross sectional view of the sealing unit; and

Fig. 5 is a cross sectional view drawn to an enlarged scale and showing the environment in which the sealing device is adapted to be used.

The present invention is broadly an improvement upon my co-pending application, Serial No. 620,853, now Patent No. 2,884,267, filed November 7, 1956.

Heavy duty tractors of the track-laying type employ a number of sealing devices which must be rugged and capable of withstanding the hard usage to which such machines are normally put. The track driving wheels of a machine of this type are mounted upon a drive shaft that projects out of the main gear box of the tractor and and two large diameter heavy duty sealing devices are required for each drive wheel to prevent escape of lubricants and to prevent entrance of dirt, dust and the like, into the gear box. Such tractors are also equipped with a plurality of small wheels commonly called "bogey wheels," that engage the track and aid in supporting the tractor thereon. Each of the "bogey wheels" is equipped with two sealing devices to prevent loss of lubricant and prevent entrance of dirt and grime into the bearings by which the wheels are supported on their axles.

The present invention relates to a heavy duty sealing device constructed in such a manner that it may be employed for sealing the main drive shaft of a track-laying tractor and may be scaled down to smaller dimension and used to seal the "bogey wheels" of such machine. The sealing device of the present invention may also be put to other uses advantageously.

The device of the present invention consists of a spring unit and a sealing unit, which units are fabricated and completely assembled separately and then joined together to complete the construction of the sealing device.

The spring unit preferably consists of front and rear members each formed out of rolled metal, preferably steel, which members are urged apart by spring means disposed within a channel-like space formed in the members, and are prevented from being separated by the spring means through interengagement of elements on the front and rear members.

The sealing unit comprises locating and mounting rings to which an elastomer bellows is bonded and extended therefrom in generally cylindrical configuration, the bellows having at its free end an integral annular washer-like portion which is adapted to engage the rear member of the spring unit to seal the device. Through this arrangement of unitary self-contained units, the spring unit can be completely assembled and tested to determine its characteristics, such as degree of compression responsive to the application of a specific load thereto, prior to the addition of the seal unit. The seal unit can be readily attached to the spring unit and as a result the danger of damage to the seal unit during assembly of the sealing device is minimized, if not completely eliminated.

The invention will be best understood by reference to the accompanying drawings from which it will be seen that the sealing device comprises a spring unit indicated generally at 1, and a sealing unit indicated generally at 2.

The spring unit comprises a rear member 3 which consists of an annulus 4, from the inner edge of which a slotted cylinder projects forwardly, the slots 5 in this cylinder separating wall portions 6 thereof. The number of slots and wall portions and the dimensions of each will depend upon the desired characteristics to be built into the sealing device and may be varied within the teachings of the invention. Preferably the plurality of slots 5 together constitute slightly more than half of the circumference of the cylindrical portion and the wall portion 6 thereof constitutes slightly less than half of that circumference.

Also projected forwardly from the outer edge of the annulus 4 is an outer cylindrical wall 7 which is solid. Annulus 4 carries a plurality of locating pins 8, the number and spacing of which will depend upon the requirements of the machine part with which the device is to be used. The pins 8 are secured in the annulus preferably by welding.

The seal unit also comprises a front portion, indicated generally at 9, which consists of a front annulus 10 from the inner edge of which a cylindrical wall 11 projects rearwardly, the free edge of this wall being equipped with a plurality of spaced apart flange segments 12, each of which has circumferential length such as to permit it to slide freely in a slot 5 in the rear member 3. Projecting rearwardly from the outer edge of the annulus 10 is an outer cylindrical wall 13 which, it will be noted, is of diameter slightly less than that of the outer cylindrical wall 7 of the rear member 3.

Fitted against the forward face of the annulus 4 of the rear member is a metallic washer 14 that contains a plurality of perforations 15 which form sockets for seating the rear ends of coil springs 16. The number and spacing of the perforations 15 and the number of coil springs employed will depend upon the specifications pertaining to the machine part with which the unit is to be used.

Fixed against the rear face of the front annulus 10 is a metal locating annulus 17 out of which a plurality of generally cylindrical bosses 18 are projected, these bosses projecting into the coil springs 16 and serving to position these springs with respect to the front member 9. Preferably the washer 14 is secured to the annulus 4 as by welding, and, if desired, the annulus 17 may be similarly secured to the annulus 10, although ordinarily this will not be required.

Projecting from the edges of the wall portions 6 are projections 19 which overhang the flanges 12 and serve to secure the spring units together.

To permit assembly of the spring unit the rear member 3 thereof is initially formed so that the cylindrical wall portions 6 thereof do not form a right angle with the annulus 4, but rather form an angle slightly greater than a right angle.

To assemble the spring unit, coil springs 16 are registered in the perforations 15 in the washer 14 and with the bosses 18 in the annulus 17. The front member 9 is then registered with the locating annulus 17, and flange segments 12 aligned with slots 5, and pressure then applied to the two members to compress the springs 16 so as to bring the flange segments 12 below the projections 19, as shown in Fig. 3. A suitable die is then employed to force the wall sections 6 outwardly into right angle relation with respect to the annulus 4, thereby bringing the projections 19 into the path of the flanges 12 so that when pressure is released from the members, spring 16 will force the members apart and bring the projections 19 into engagement with the flanges and thereby secure the members 3 and 9 together as a unit.

This arrangement is advantageous in that it permits use of coil springs such as 16, which when in their free state are longer than the distance between annulus 4 and annulus 10 when the flange segments 12 are engaged with the projections 19. As a result, the coil springs must be compressed and hence are pre-loaded during assembly of the spring unit.

As will be noted from Fig. 2, when the spring unit is fully expanded and held by interengagement of the projections 19 and flange segments 12, there is a space between the adjacent edges of the outer cylindrical walls 7 and 13. As will be seen best in Fig. 5, when the sealing device is in operating position, wall 13 telescopes into wall 7, thereby to form an outer barrier that prevents the elastomer bellows of the sealing device from coming into contact with the springs 16. It will also be noted that slots 5 in the inner cylindrical wall of the rear member 3 do not extend into the plane of the annulus 4, but rather there is a short wall section 20 at the rear end of each slot 5. Preferably the outer and inner cylindrical walls of the front member 9 are of such dimension that when the spring unit is compressed sufficiently to bring the flange segments 12 into engagement with the wall portions 20 the rear end of the outer cylindrical wall 13 will abut against the front face of the washer 14, this occurring just prior to the engagement together of adjacent convolutions of the coil springs 16 thereby to prevent damage to those springs.

The rear member 3, front member 9, washer 14 and annulus 17 are all composed of rolled metal, preferably steel, and these members together with the springs 16 are preferably plated with a protective plating to prevent rusting.

As will be seen in Fig. 3, the forward face of the annulus 9 and the inner face of the cylindrical wall portion 11 are roughened, as indicated at 21, preferably as by coarse sandblasting, for a purpose which will hereinafter appear.

The seal unit, indicated generally at 2, will be best seen in Fig. 4 and comprises a locating ring 30 consisting of a cylindrical portion 31 that is of such dimension as to have press fit engagement with the inner face of the cylindrical wall 11 of the front member 9. Extending radially outwardly from the cylindrical wall 31 is an annulus 32, and a short flange 33 extends forwardly from the outer edge of the annulus 32. Fixed to the outer surface of the annulus 32 and inner surface of the flange 33 is a mounting ring 34. The locating ring and mounting ring are secured together preferably by welding and are preferably plated or otherwise treated to prevent rusting.

Bonded to the outer peripheral faces of the flange 33 and mounting ring 34 is an elastomer bellows having a frusto-conical portion 35 from the rear edge of which a generally cylindrical portion 36 extends. Integral with the cylindrical portion and located at the end thereof remote from the mounting ring is an elastomer annulus 37 that contains a plurality of perforations 38 located so as to permit the pins 8 of the spring member to project therethrough. On the rear face of the annulus 37 are ribs 39 which are compressed against a machine part to form a seal therewith. In the molding of the elastomer to the flange and mounting ring there may be a thin flash of elastomer across the rear face of the portion 32. While this thin wall of elastomer is not required, it does not do any particular harm and may aid in forming a fluid tight seal between the sealing unit and spring unit.

It will be noted that the forward face of the mounting ring 34 contains a groove into which the seal ring 40 is positioned and secured as by cementing. The seal ring 40 may be composed of any one of a number of different materials within the teachings of the invention. In one instance, the seal ring 40 is composed of cork. If desired, the seal ring 40 may be registered with and cemented to the mounting ring 34 prior to assembly of the seal unit 2 on the spring unit 3; however, preferably the seal ring 40 is not so attached until after the seal unit 2 has been applied to the spring unit.

When it is desired to assemble the sealing device, the locating ring 30 is registered with the front number 9 and the cylindrical portion 31 thereof pressed into press fit engagement with the cylindrical wall 11. If desired, pressure may be applied to the spring unit so as to compress the springs 16 somewhat and the bellows is then positioned outside of the units 1 and 2, and the annulus 37 thereof brought into engagement with the rear face of the rear annulus 4 with the pins 8 projecting through the perforations 38 in the annulus 37. Pressure is then removed to permit the spring 16 to expand and bring the flanges 12 into engagement with the projections 19 and the sealing device is completed by the addition of the sealing ring 40 to the mounting ring 34.

The roughened surfaces 21 on the front member 9 set up an appreciable resistance between that member and the cylindrical wall 31 of the locating ring 30, and this friction ordinarily will be sufficient to resist torque set up by the sealing ring and tending to rotate the sealing unit 2 with respect to the spring unit 3. If desired, additional security against such rotation may be achieved by spot welding the cylindrical wall 31 against the cylindrical wall 11 at points adjacent the flanges 12, as indicated at 41, Fig. 2.

From the foregoing, it will be apparent that the sealing device of the present invention contains a minimum number of parts and as a result can be fabricated and assembled at low cost without sacrificing quality. When the device is in fully expanded condition, such as is shown in Fig. 2, there is little or no strain upon the elastomer bellows, notwithstanding that the springs are pre-loaded, and as a result long shelf life of the sealing device can be expected.

As will be seen in Fig. 5, the sealing device is used in conjunction with relatively movable machine parts 50 and 51. The part 51 contains a recess into which the sealing device fits, with the pins 8 projecting into sockets in the rear wall of the recess to key the sealing device with respect to the part 51. Fixed upon the machine part 50 is a seal plate 52 preferably formed of steel hardened and polished, the plate being keyed with respect to part 50 in any preferred manner such as by pins 53. A gasket 54 interposed between the plate 52 and the part 50 seals at this point.

As shown in Fig. 5, the sealing device is in normal working position. It will be observed that the outer wall 13 on the front member 9 telescopes into the outer wall 7 on the rear member so that the two walls form a baffle that is disposed between the bellows 36 and the spring 16. It will also be observed that there is an appreciable space within the cavity in the member 52 and surrounding the bellows. Should this space become filled with mud or dirt which exerts pressure on the outer face of the bellows, the baffle formed by walls 7 and 13 prevent this pressure from forcing the bellows into contact with the spring 16 and as a result damage to the bellows is thereby prevented.

It will be observed that with the sealing device in working position, ribs 39 on the annular portion 37 of the elastomer bellows are flattened thereby to form a fluid tight seal with the rear wall of the cavity in the member 51. It will also be observed that the generally frusto-conical portion 35 of the elastomer presents no appreciable surface that is parallel to the rear face of the seal plate 52 and as a result build-up of mud sufficient to prevent proper seating of the sealing ring 40 with the seal plate 52 is definitely prevented.

The sealing device, being composed of two separate units, can be fabricated with a minimum of molding operations and can be scaled up or down in size as required to meet the requirements of tractors of various capacity, both as a sealing device for the main drive shaft of those tractors and also as sealing devices for the "bogey wheels" thereof.

While I have chosen to show my invention by illustrating and describing a preferred embodiment thereof, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. A device for forming a fluid tight seal between two relatively rotatable machine parts one of which contains a radially disposed sealing surface, comprising: a front metallic member consisting of a front annulus with cylindrical walls extending rearwardly from the inner and outer edges of the annulus; a rear metallic member consisting of a rear annulus with cylindrical walls extending forwardly from the inner and outer edges of said annulus; spring means interposed between said members urging them apart; interengaged means on said front and rear members for holding the same together as a unit against said spring means and for preventing relative rotation of the members; a seal ring; means for mounting said seal ring upon said front metallic member; and an elastomer bellows fixed to said mounting means and extending outwardly and rearwardly therefrom outside said front and rear members and into engagement with the rear face of said rear annulus.

2. A device as specified in claim 1, in which the means for holding the front and rear members together as a unit comprises slots in the inner cylindrical wall of the rear member into which flange segments on the inner cylindrical wall of the front member project, and projections on said rear member wall extending into said slots and overhanging said flange segments.

3. A device as specified in claim 1, in which the means for mounting the seal ring comprises: a locating cylinder having press fit with the inner cylindrical wall of the front annulus, a locating annulus integral with said cylinder and extending across the front face of said front annulus, a flange projecting forwardly from the outer periphery of said locating annulus, a mounting ring fixed on the front face of said locating annulus and to said flange, said mounting ring having a groove in its forward face in which the seal ring is fixed.

4. A device as specified in claim 3, in which the inner surface of the inner cylindrical wall of the front annulus has a roughened finish to provide high friction between the wall and the locating cylinder which has press fit therewith.

5. A device as specified in claim 3, in which the bellows is fixed to said mounting means by bonding to the outer peripheral surfaces of the flange and mounting ring.

6. A device as specified in claim 5, in which the bellows comprises a frusto-conical section extending rearwardly and outwardly from the mounting ring, a cylindrical section extending rearwardly from said frusto-conical section, and an annular section extending radially inwardly from the end of said cylindrical section that is remote from said mounting ring.

7. A device as specified in claim 6, in which when the device is in operating position the outer cylindrical wall of the front member telescopes into the outer cylindrical wall on the rear member to form therewith a barrier that prevents the bellows from engaging the spring means.

8. A device as specified in claim 7, in which the pins project rearwardly from the rear face of the rear annulus and in which the annular section of the bellows contains perforations through which said pins project.

9. A seal unit for attachment to the telescopical spring cage of a device for forming a seal between two relatively rotatable machine parts one of which contains a radially disposed sealing surface, comprising: a locating ring including a cylindrical portion dimensioned for press fit engagement with the cage, an annulus extending radially outwardly from one end of said cylindrical wall and a flange on the outer edge of said annulus extending axially therefrom in a direction opposite the cylindrical portion; a mounting ring fixed upon said locating ring and engaging the annulus and flange thereof; a seal ring fixed upon said mounting ring; and an elastomer bellows chemically bonded to the outer peripheral areas of said flange and mounting ring and having a frusto-conical section extending rearwardly and outwardly therefrom, a cylindrical section extending rearwardly from the rear end of said frusto-conical section, and an annular section extending inwardly from the rear end of said cylindrical section.

References Cited in the file of this patent
UNITED STATES PATENTS

| | | |
|---|---|---|
| 2,089,773 | Vedovell | Aug. 10, 1937 |
| 2,311,494 | Vedovell | Feb. 16, 1943 |
| 2,358,830 | Schick | Sept. 26, 1944 |
| 2,491,233 | Vedovell | Dec. 13, 1949 |
| 2,521,137 | Vedovell | Sept. 5, 1950 |
| 2,823,057 | Slight et al. | Feb. 11, 1958 |